(12) United States Patent
Bork

(10) Patent No.: US 8,839,978 B2
(45) Date of Patent: Sep. 23, 2014

(54) TETHER AND CLOSURE ASSEMBLY INCLUDING SAME

(71) Applicant: Bemis Manufacturing, Sheboygan Falls, WI (US)

(72) Inventor: Kevin W. Bork, Germantown, WI (US)

(73) Assignee: Bemis Manufacturing Company, Sheboygan Falls, WI (US)

( * ) Notice: Subject to any disclaimer, the term of this patent is extended or adjusted under 35 U.S.C. 154(b) by 0 days.

(21) Appl. No.: 13/663,419

(22) Filed: Oct. 29, 2012

(65) Prior Publication Data
US 2013/0105485 A1  May 2, 2013

Related U.S. Application Data

(60) Provisional application No. 61/552,802, filed on Oct. 28, 2011.

(51) Int. Cl.
   *B65D 55/16* (2006.01)
   *B60K 15/04* (2006.01)

(52) U.S. Cl.
   CPC ..... *B60K 15/0406* (2013.01); *B60K 2015/0432* (2013.01); *B60K 2015/0438* (2013.01); *B65D 55/165* (2013.01); *B65D 55/16* (2013.01)
   USPC ................ 220/375; 222/543; 24/298; 24/301

(58) Field of Classification Search
   CPC ....... B65D 55/16; B65D 55/165; B65D 35/44
   USPC ............ 220/266, 268, 780, 306, 375; 292/76, 292/95; 403/157; 411/510; 24/297, 298, 24/301; 206/508; 215/230; 248/71; 222/543
   See application file for complete search history.

(56) References Cited

U.S. PATENT DOCUMENTS

| | | | | | |
|---|---|---|---|---|---|
| 163,026 | A | * | 5/1875 | Murray | 215/267 |
| 377,275 | A | * | 1/1888 | Ringen | 220/379 |
| 572,758 | A | * | 12/1896 | Jacobs | 215/294 |
| 650,181 | A | * | 5/1900 | Lachenmeyer | 215/294 |
| 876,101 | A | * | 1/1908 | Schweinert et al. | 383/96 |
| 1,408,082 | A | | 2/1922 | Dowler | |
| 1,450,077 | A | * | 3/1923 | Haas | 220/375 |

(Continued)

OTHER PUBLICATIONS

International Search Report and Written Opinion for Application No. PCT/US2012/062493 dated Feb. 21, 2013 (9 pages).

*Primary Examiner* — Mickey Yu
*Assistant Examiner* — Gideon Weinerth
(74) *Attorney, Agent, or Firm* — Michael Best & Friedrich LLP

(57) ABSTRACT

A closure assembly for closing an opening in a container includes a closure member including an engagement structure configured to engage the opening. A tether includes a connector portion, a first end, and a second end. The first end is coupled to the closure member and the second end is opposite the first end. A plurality of barbs are positioned at the second end of the tether, each of the plurality of barbs has a rigid construction. The plurality of barbs define a maximum splayed dimension to retain the closure member with respect to the opening. A movable joint couples each of the plurality of barbs to the second end. Each of the plurality of barbs is foldable about the respective movable joint so that the plurality of barbs define a dimension substantially smaller than the maximum splayed dimension to allow insertion through the opening.

23 Claims, 9 Drawing Sheets

(56) References Cited

U.S. PATENT DOCUMENTS

| | | | |
|---|---|---|---|
| 1,458,346 A * | 6/1923 | Krentz et al. | 220/375 |
| 1,518,467 A * | 12/1924 | Van Pelt | 220/288 |
| 1,563,749 A * | 12/1925 | Josef | 220/375 |
| 1,573,096 A * | 2/1926 | Schlaich | 220/288 |
| 1,711,287 A * | 4/1929 | Schlaich | 220/375 |
| 1,735,132 A * | 11/1929 | Schlaich | 220/288 |
| 3,276,167 A * | 10/1966 | Hirche et al. | 49/489.1 |
| 4,339,056 A * | 7/1982 | Berkstresser et al. | 220/375 |
| 4,842,152 A | 6/1989 | Donegan | |
| 4,867,337 A | 9/1989 | Eichenseer | |
| 4,872,587 A | 10/1989 | Zimmermann et al. | |
| 5,165,565 A * | 11/1992 | Schlessmann et al. | 220/304 |
| 5,720,409 A * | 2/1998 | Asakura et al. | 220/375 |
| 8,141,736 B2 * | 3/2012 | Takahashi et al. | 220/375 |
| 2005/0087656 A1 * | 4/2005 | Yonezawa | 248/71 |
| 2007/0170187 A1 * | 7/2007 | Tharp et al. | 220/303 |
| 2009/0223959 A1 | 9/2009 | Schulz et al. | |

\* cited by examiner

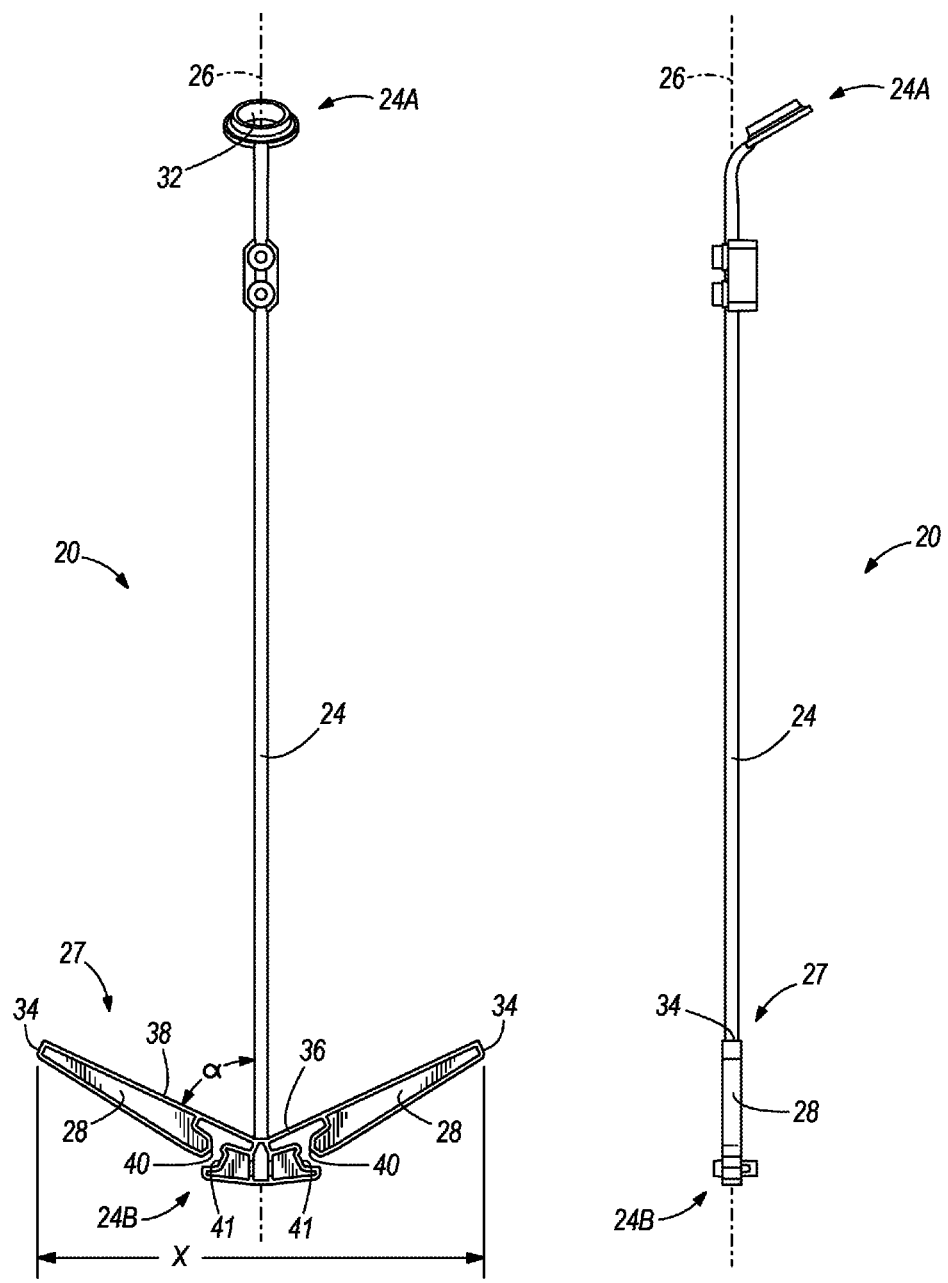

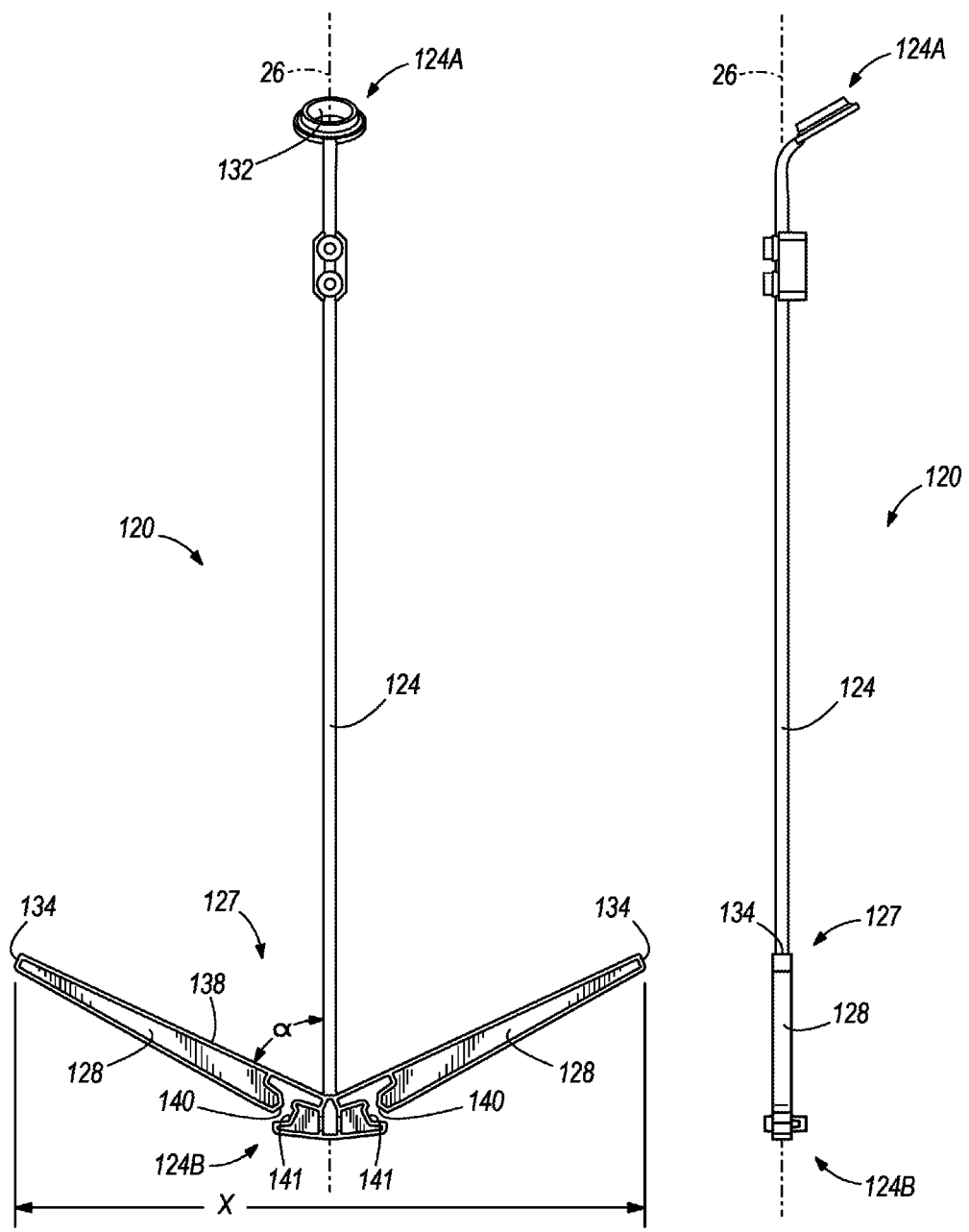

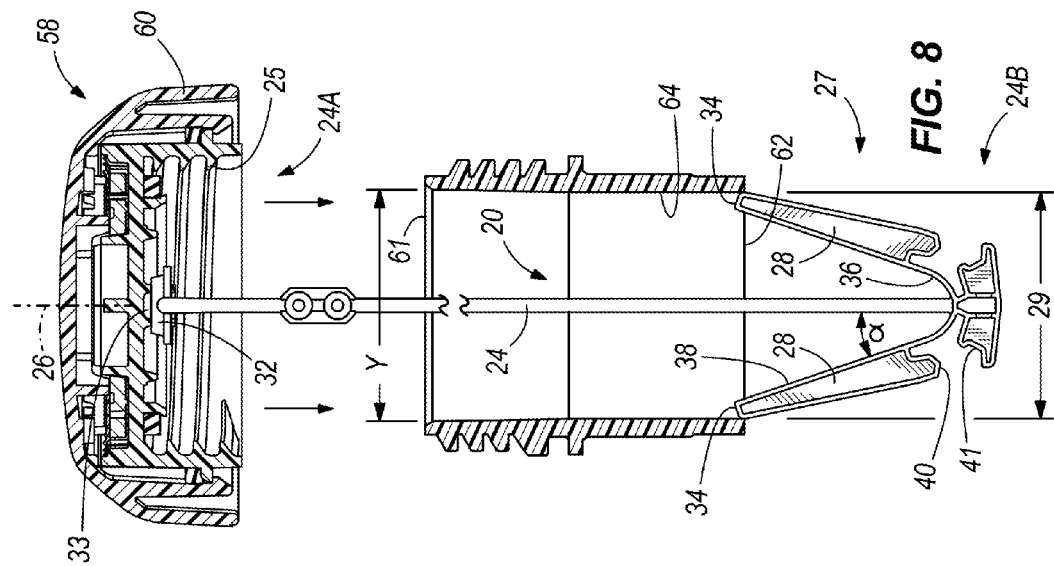
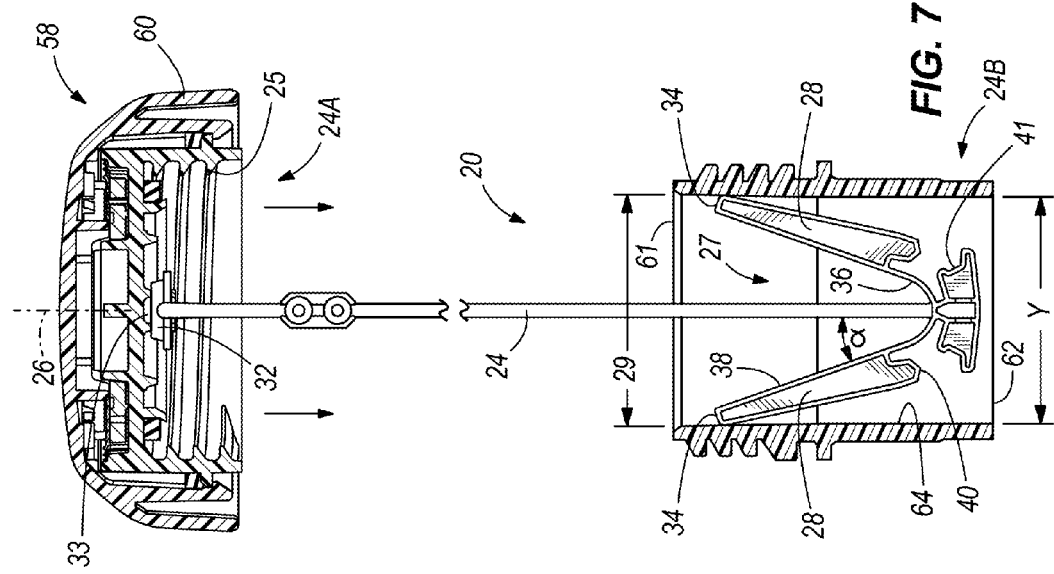

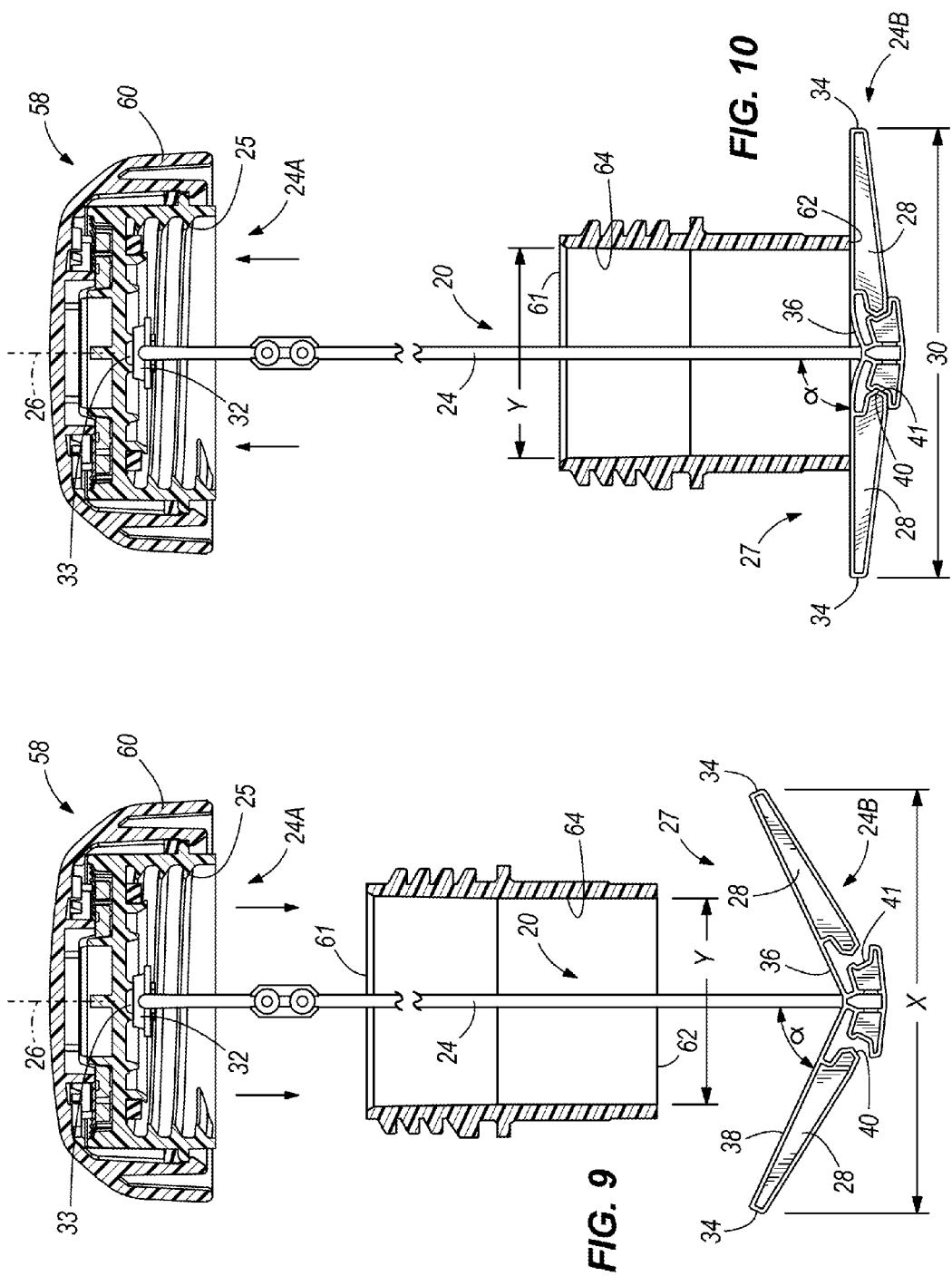

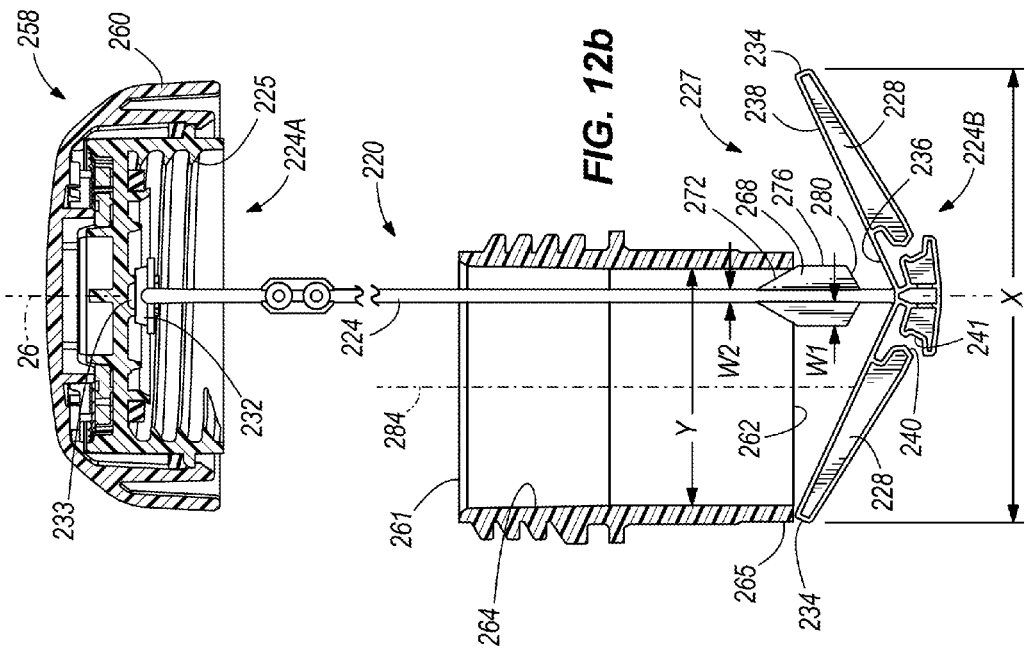
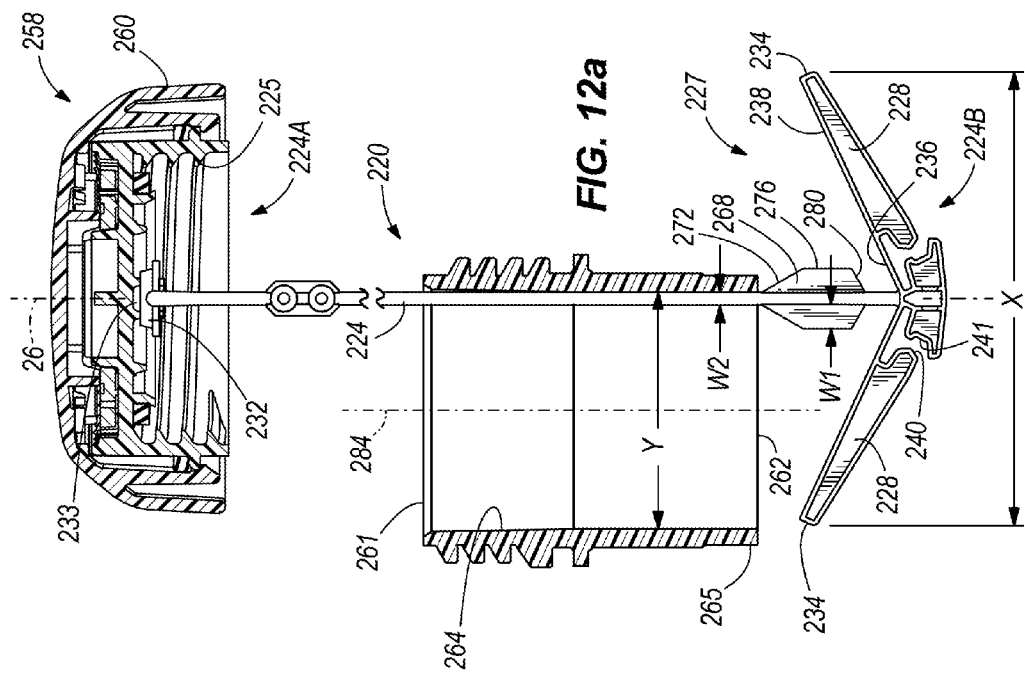

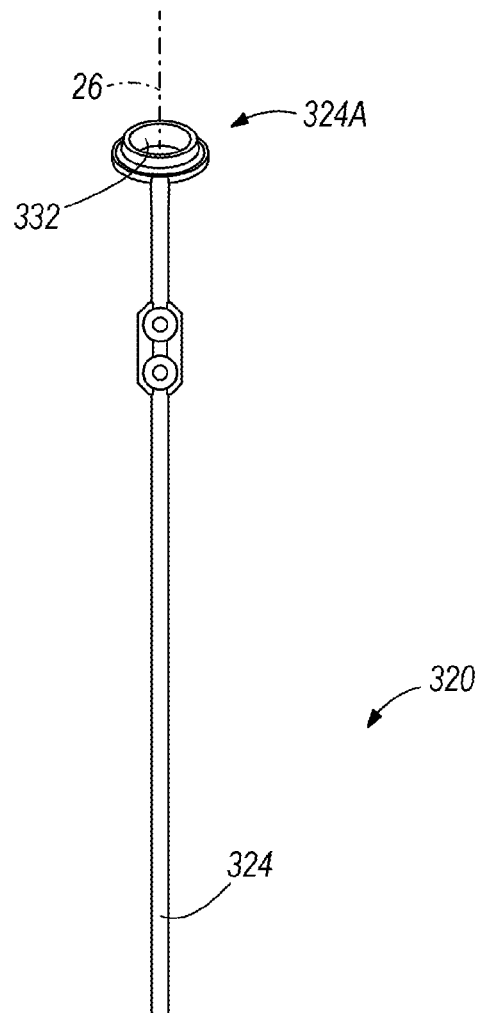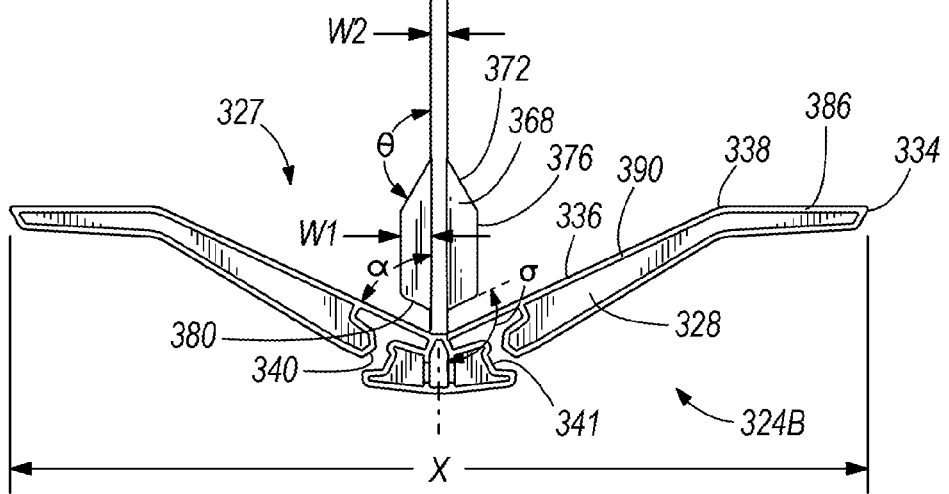
FIG. 13

TETHER AND CLOSURE ASSEMBLY INCLUDING SAME

CROSS-REFERENCE TO RELATED APPLICATIONS

This Application claims priority to U.S. Provisional Patent Application No. 61/552,802, filed Oct. 28, 2011, the entire contents of which are incorporated herein by reference.

BACKGROUND

The present invention relates to tethers for closures, such as caps or other closures (e.g., fuel caps), that close openings in containers.

Tethers are commonly affixed to a portion of a cap and are coupled to a portion of the container to retain the cap in connection with the container even when the cap is removed from engagement with the container opening. Internal style tethers are affixed to an interior side of a cap and retain the cap with the container by extending into and engaging with an interior of the container.

Known internal style tethers can include flexible barbs that enable easy assembly into a container opening, but suffer from extremely limited resistance to being pulled back out of the opening. Some internal tethers include a rope or chain member coupling a plurality of barbs to the cap. The rope or chain member can make it particularly difficult to initially install the tether into a container opening, especially when the opening has an extended length, since the rope or chain member does not facilitate pushing the barbs through the opening. Rope or chain type connectors also preclude effective bulk packaging, since the rope or chain connectors can easily become tangled.

SUMMARY

In one aspect, the invention provides a closure assembly for closing an opening in a container. A closure member includes an engagement structure configured to engage the opening. A tether includes a connector portion with a first end coupled to the closure member and a second end opposite the first end. A plurality of barbs are positioned at the second end of the tether, and each of the plurality of barbs has a rigid construction. The plurality of barbs define a maximum splayed dimension to retain the closure member with respect to the opening. A movable joint couples each of the plurality of barbs to the second end. Each of the plurality of barbs is foldable about the respective movable joint so that the plurality of barbs define a dimension substantially smaller than the maximum splayed dimension to allow insertion through the opening.

In another aspect, the invention provides a tether for retaining a closure member with respect to an opening. The tether has a connector portion having a first end and a second end. The first end includes a coupling structure configured to secure the closure member. A plurality of barbs are positioned at the second end of the tether. Each of the plurality of barbs has a rigid construction. The plurality of barbs define a maximum splayed dimension to retain the closure member with respect to the opening. A hinge portion couples each of the plurality of barbs to the second end. Each of the plurality of barbs is foldable about the respective hinge portion so that the plurality of barbs define a dimension substantially smaller than the maximum splayed dimension to allow insertion through the opening.

Other independent aspects of the invention will become apparent by consideration of the detailed description and accompanying drawings.

BRIEF DESCRIPTION OF THE DRAWINGS

FIG. 1 is a front view of a tether according to a first construction, including a plurality of foldable barbs.

FIG. 2 is a side view of the tether of FIG. 1.

FIG. 3 is a front view of a tether according to a second construction, including a plurality of foldable barbs proportionally larger than those of FIGS. 1-2.

FIG. 4 is a side view of the tether of FIG. 3.

FIG. 7 illustrates the tether of FIG. 6 in which the barbs have a folded dimension smaller than a transverse dimension of the opening.

FIG. 8 illustrates the tether of FIG. 7 about to pass through a bottom edge of the container opening.

FIG. 9 illustrates the tether of FIG. 8 in which the barbs have passed the bottom edge and returned to their normally biased rest position.

FIG. 10 illustrates the tether of FIG. 9 pulled back to engage the bottom edge of the container opening.

FIG. 12*a* illustrates a closure assembly including the tether of FIG. 11 inserted into a container opening so that the flanges extend below a bottom edge of the container opening.

FIG. 12*b* illustrates the closure assembly of FIG. 12*a* with one of the flanges engaging the bottom edge of the opening to limit the position of the opposing barb relative to the opening.

FIG. 13 is a front view of a tether according to a fourth construction, including a plurality of foldable barbs and position control flanges provided on a connector portion thereof.

DETAILED DESCRIPTION

Figure 5:
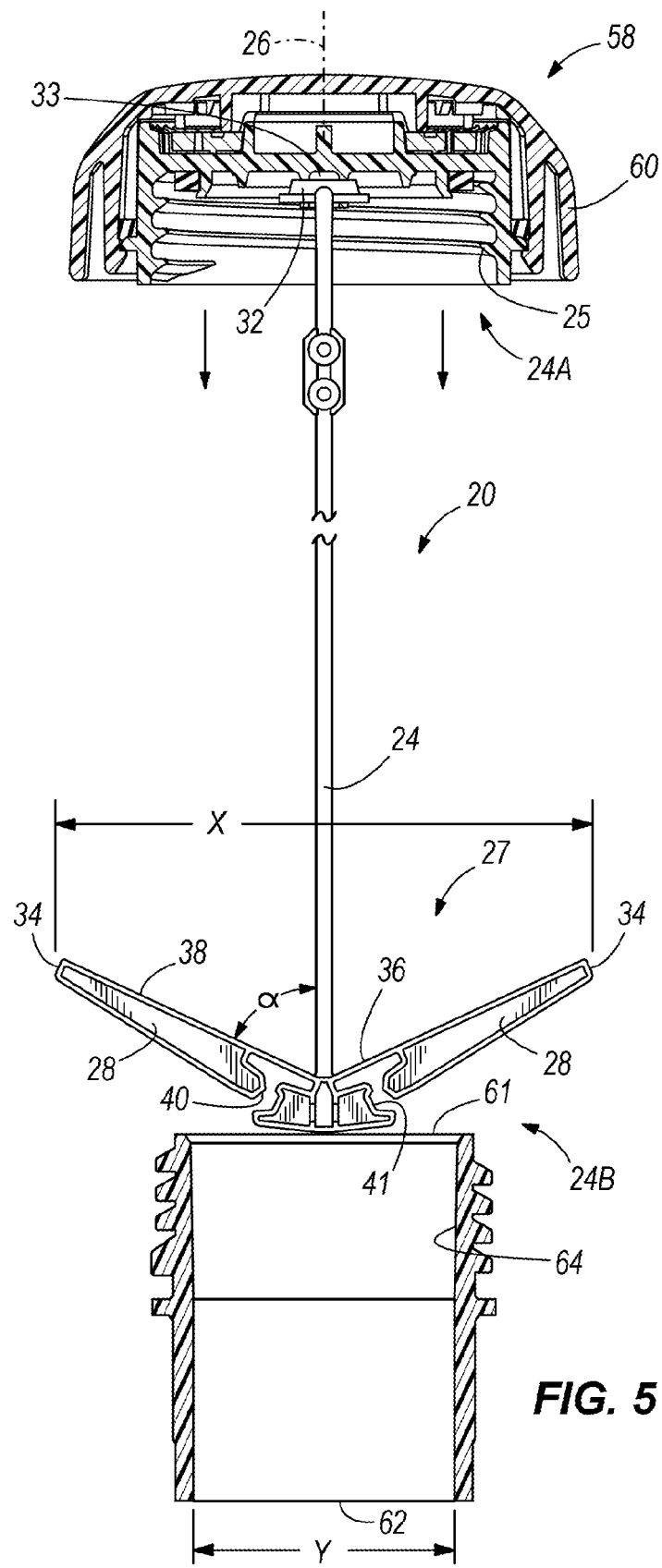
FIG. 5 illustrates a closure assembly including the tether of FIGS. 1-2 prior to insertion into a container opening.

Before any independent embodiments of the invention are explained in detail, it is to be understood that the invention is not limited in its application to the details of construction and the arrangement of components set forth in the following description or illustrated in the following drawings. The invention is capable of other independent embodiments and of being practiced or of being carried out in various ways.

FIGS. 1-2 and 5-10 illustrate a tether 20 of a first construction. The tether 20 includes a connector portion 24 defining an axis 26 and a catch portion 27 including a plurality of barbs 28. The plurality of barbs 28 (e.g., two barbs) are diametrically opposed from each other about the axis 26 in the illustrated construction, but other arrangements are optional. The connector portion 24 is shape-stable, i.e., although flexible, it retains its original shape, and is constructed of a non-flaccid material (e.g., molded HDPE), as opposed to a flaccid chain or rope.

A first end 24A of the connector portion 24 is configured to couple to a closure member (e.g., the inside of a cap 60) as shown in FIGS. 5-10. The closure member 60 includes an engagement structure 25 configured to engage a container opening 64. The engagement structure 25 may be threads or any other type of well know engaging structure configured to engage the container opening 64. The first end 24A of the connector portion 24 may be configured with any desired type of coupling structure or may be integrally-formed as a single piece with the closure member 60. In the illustrated construction, the first end 24A of the connector portion is provided with an aperture 32 for receiving a fastener 33, which may be a screw, a rivet, or any other desired fastener type. The aperture 32 or other structure at the first end 24A may be oriented flat (parallel) relative to an interior-facing surface of the cap, turned 90 degrees (perpendicular) relative thereto, or at any other angle. In some constructions, the tether 20 may be attached to the underside of the closure at the first end 24A by other methods, such as infrared staking, welding, etc.

The plurality of barbs 28 are provided at a second end 24B of the connector portion 24 opposite the first end 24A and, thus, remote from the closure member 60. In the illustrated construction, each of the plurality of barbs 28 has a rigid construction which, itself, does not allow a substantial amount of deflection for assembling the tether 20 into the container opening 64. However, each of the plurality of barbs 28 is coupled to the second end 24B of the connector portion 24 with a movable joint 36. Each of the plurality of barbs 28 has a distal end 34 opposite the movable joint 36.

As shown in FIGS. 1 and 2, the movable joint 36 is integrally-formed as a single piece with the second end 24B of the connector portion 24, but has a substantially smaller cross-sectional thickness. The movable joint 36 is a flexible strip constructed of the same material as the connector portion 24 and the barbs 28 (e.g., HDPE). The strip forming the movable joint 36 forms a living hinge portion that enables localized flexibility. This allows for the catch portion 27 to have high strength to anchor the tether 20 to the container opening 64, while having the ability to flex, or fold for assembly through the container opening 64. Each of the plurality of barbs 28 is foldable about the respective movable joint 36 so that the plurality of barbs 28 define a folded dimension 29 (FIG. 8) substantially smaller than a maximum splayed dimension 30 (FIG. 10) to allow insertion through the opening 64. The plurality of barbs 28 define the maximum splayed dimension 30 in a fully extended position to retain the closure member 60 with respect to the opening 64 as shown in FIG. 10. In other constructions (not shown), the structure providing flexibility may have a different configuration, such as one or more openings, notches, etc., in the region of the movable joint 36.

In still other constructions (not shown), the barbs 28 may be rigid members separate from the connector portion 24 and coupled to the second end 24B of the connector portion 24 via the movable joint 36 including, for example, a mechanical hinge. In yet other constructions (not shown), the movable joint 36 may be formed of a material with increased flexibility, in addition to or instead of the structure providing flexibility (e.g., the strip described above).

With continued reference to FIGS. 1 and 2, the barbs 28 are movable relative to the connector portion 24 in a bi-lateral direction via the joint 36. The construction of the joint 36 enables the barbs 28 to be folded so that the distal ends 34 pivot toward the first end 24A of the connector portion 24. As shown in FIG. 1, each of the plurality of barbs 28 defines a first surface 38 that faces the first end 24A of the connector portion 24 and forms an angle $\alpha$ between the axis 26 and the first surface 38. When the barbs 28 are in a naturally biased rest position as shown in FIG. 1, the angle $\alpha$ can be between about 30 degrees and about 90 degrees (e.g., about 60 degrees as shown), and the barbs 28 define a nominal transverse dimension X. The angle $\alpha$ is substantially 90 degrees in a fully extended position shown in FIG. 10, although other angles may be prescribed.

On the opposing side of each movable joint 36 (facing away from the connector first end 24A), each barb 28 includes a limiting structure (e.g., a surface 40 facing radially inward) that limits the flexure of the angle $\alpha$ to a predetermined maximum. As illustrated, the predetermined maximum of the angle $\alpha$ is about 90 degrees. The second end 24B of the connector portion 24 includes a limiting surface 41 that is configured to abut with the limiting surface 40 when in the fully extended position. The limiting surface 41 faces radially outward to contact the limiting surface 40. Thus, in the illustrated construction, the second end 24B of the connector 24 firmly reinforces the barbs 28 to prevent the barbs 28 from pivoting about the joint 36 to an orientation in which the distal ends 34 of the barbs 28 point away from the first end 24A (a greater than 90 degrees).

FIGS. 3 and 4 illustrate another construction of a tether 120, which is identical to the above described tether 20, except that the barbs 128 are proportionally larger compared to the connector portion 124. Common elements have the same reference numbers incremented by 100. For the sake of brevity, a description of the construction of the tether 120 is not repeated, and the above description of the tether 20 is understood to apply.

FIGS. 5-10 illustrate a closure assembly 58 that includes the tether 20 of FIGS. 1 and 2 in coupled relationship with the underside of a closure member, such as a cap 60, having an engagement structure 25 for engaging the container opening 64. In the illustrated construction, the engagement structure 25 of the cap 60 includes female threads formed at an interior of the cap 60. However, the engagement structure 25 can be exterior male threads or another structure other than threads in other constructions. When released from the opening 64, the cap 60 is kept in proximity to the opening 64 by the tether 20, whose barbs 28 engage an interior end 62 of the opening 64. As should be understood, the tether 20 is provided with barbs 28 that have the naturally biased rest position shown as transverse dimension X and a maximum splayed dimension 30 that each exceed a transverse dimension Y of the opening 64. FIGS. 5-10 illustrate an installation sequence for installing the tether 20 through the opening 64.

Figure 6:
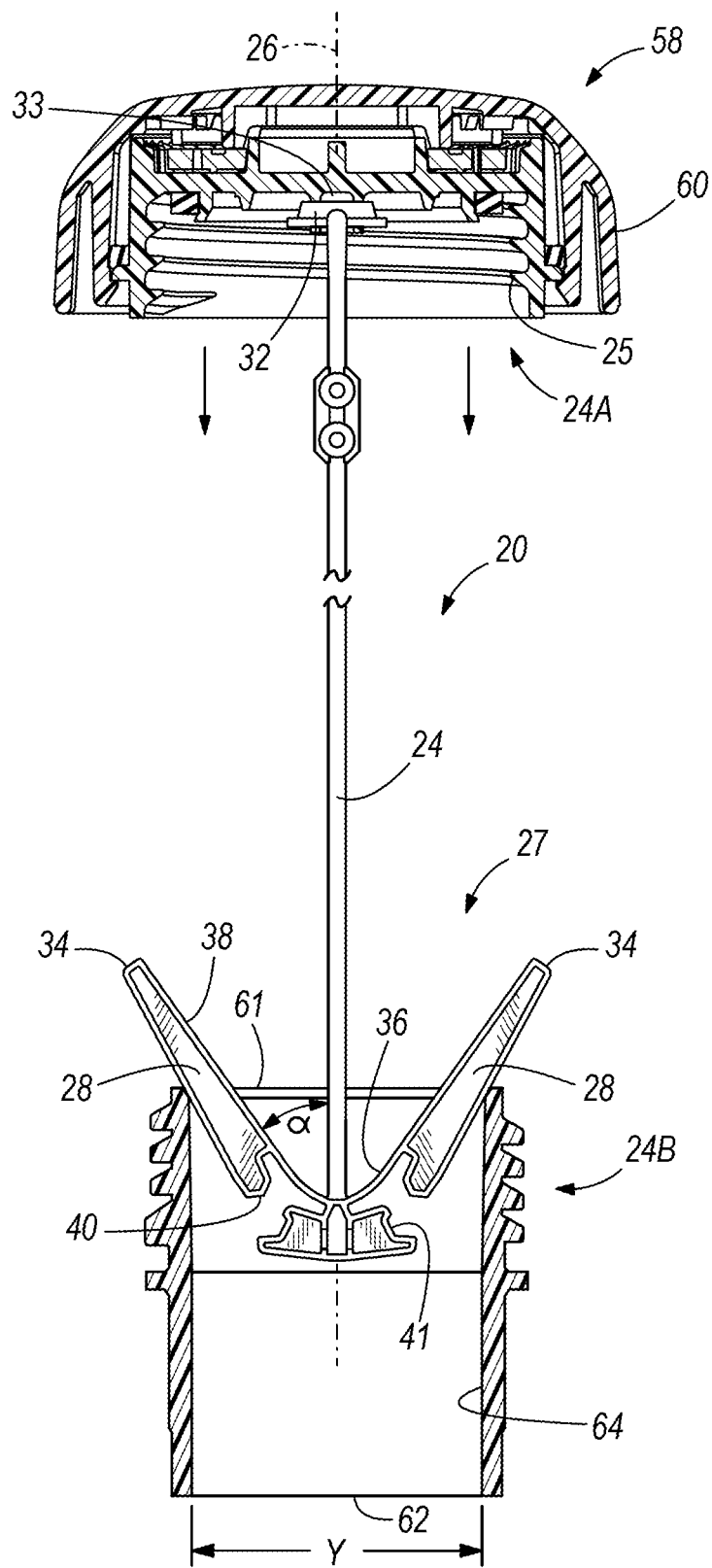
FIG. 6 illustrates the tether of FIG. 5 in which the barbs begin to fold as they engage a top edge of the container opening.

As shown in FIG. 5, the barbs 28 are placed adjacent to an exterior end 61 of the container opening 64. Although the barbs 28 cannot freely enter the container opening 64 due to the smaller size of the opening 64, pushing on the connector portion 24, as shown in FIG. 6, urges the barbs 28 to fold along the joints 36 as the joints 36 are elastically-deformed. As described above, the joints 36 provide flexibility to allow the distal ends 34 of the barbs 28 to pivot toward the first end 24A of the connector portion 24 where the cap 60 is coupled. The movable joints 36 store a biasing force when the barbs 28 are in the folded orientation. As shown in FIG. 7, the joints 36 are configured to allow the barbs 28 to reach a folded orientation in which the folded transverse dimension 29 of the barbs 28 is about equal to the transverse dimension Y of the opening 64 to allow passage therethrough. The tether 20 may be configured for a particular opening 64 such that the angle $\alpha$ between each barb 28 and the axis 26 is about half of the naturally biased rest position, about 30 degrees in the illustrated construction, as the barbs 28 are passed through the opening 64. However, other constructions are contemplated, and the joints 36 can be configured to allow more extreme folding of the barbs 28 without damage, such as folding of the barbs 28 to an orientation that is substantially parallel to the connector portion 24 ($\alpha$=0).

As shown in FIG. 8, the user continues to urge the tether 20 toward the interior end 62 of the container opening 64 by pressing on the connector portion 24. When the barbs 28 pass through the opening 64 into the expanded body portion of the container opening 64 (as shown in FIG. 9), the joints 36 resiliently urge the barbs 28 back toward the splayed orientation.

Once the barbs 28 pass fully through the restricted opening 64, as shown in FIG. 10, an outward pulling force on the cap 60 or the connector portion 24 will be resisted by the rigid barbs 28 engaging the interior end 62 of the opening 64. Contact between limiting surfaces 40, 41 provides increased resistance to the outward pulling force. By providing the movable joints 36 in combination with the rigid folding barbs 28, ease of insertion can be obtained without detracting from the tether's resistance to pull-out. For example, the illustrated tether 20 can withstand a force of 20 to 30 pounds or more without separation of the cap 60 from the opening 64. Thus, the tethers 20, 120 described herein serve as "permanent" tethers, which will not become detached from the container under normal use. In the illustrated construction, the plurality of barbs 28 define the maximum splayed dimension 30 (FIG. 10) in the fully extended position to retain the cap 60 with respect to the opening 64. In the illustrated construction, the angle α is limited to about 90 degrees when the barbs are in the fully extended position. However, the limit of the angle α can be more or less than 90 degrees in other constructions, assuming that it is configured to prevent the barbs 28 from passing through the opening 64.

The illustrated tethers 20, 120 are easier for a user to install into the container opening 64 by pushing the tether 20, 120 through the opening 64. The hinged, foldable barbs 28, 128 allow for a strong catch/anchor, but the ability to flex for insertion into tank necks. The illustrated constructions allow a single tether design to fit in multiple size tank necks with good results. Making each tether 20, 120 as a single piece component may be easier and cheaper to manufacture and assemble than a multiple piece design. Semi-rigid tethers 20, 120, such as those described and illustrated herein, which have no flaccid rope or chain components, may generally be easier to package, and may facilitate bulk shipping without having the tethers tangle during shipment.

Figure 11:
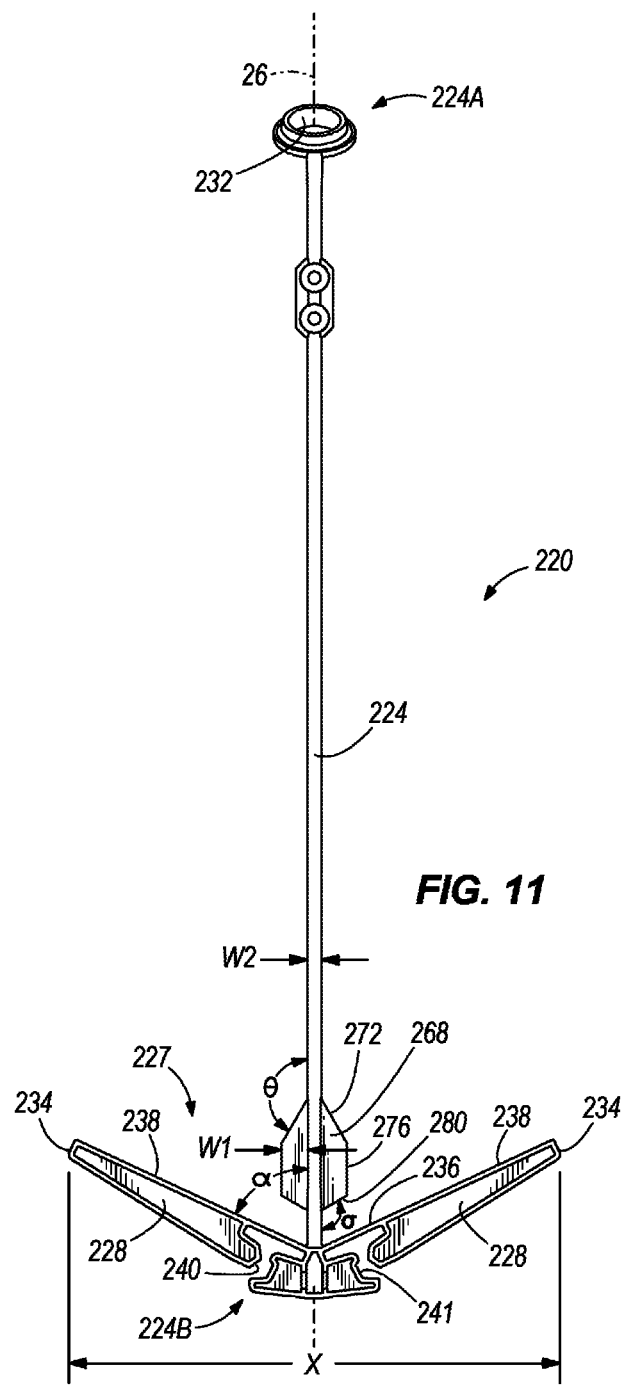
FIG. 11 is a front view of a tether according to a third construction, including position control flanges provided on a connector portion thereof.

FIGS. 11, 12a, and 12b illustrate another construction of a tether 220, which is identical to the above described tether 20, except that the connector portion 224 includes flanges 268. Common elements have reference numbers incremented by 200. For the sake of brevity, a description of the construction of the tether 220 is not repeated, and the above description of the tether 20 is understood to apply.

In the tether 220 of FIG. 11, the connector portion 224 includes flanges 268 having a first edge 272, a second edge 276, and a third edge 280. The first edge 272 and the third edge 280 are at obtuse angles θ and σ, respectively, relative to the axis 26, while the second edge 276 is parallel to the axis 26. In the illustrated construction, the flanges 268 are integrally formed as a single piece with the connector portion 224 and are constructed with the same material as the connector portion 224. Each flange 268 has a maximum width W1 as defined in a direction transverse to the axis 26. The flanges 268 are in transverse alignment with the barbs 228. The connector portion 224 defines a width W2 at the location of the flanges 268. In the illustrated construction, the width W2 is substantially constant throughout the length of the connector portion 224 along the axis 26.

As shown in FIGS. 12a and 12b, the flanges 268 are provided so that the plurality of barbs 228 do not need to be as long to ensure that they catch against the interior end 262 of the container opening 264. FIG. 12a shows the connector portion 224 abutting the container opening 264 after insertion. In this position, the distal end 234 of one of the barbs 228 lies within the interior dimension Y of the opening 264 potentially preventing the barb 228 from catching against the interior end 262 of the opening 264. This could allow the tether to be accidentally removed from the opening 264, or to become jammed in the opening 264. However, as shown in FIG. 12b, the flanges 268 are provided to limit the amount of offset of the connector portion 224 from the center of the container opening 264, as defined by axis 284, to ensure that the barbs 228 will catch against the interior end 262 container opening 264. To ensure that the barbs 228 catch against the interior end 262 of the opening 264, the maximum width W1 of each flange 268 is greater than the interior dimension Y of the opening 264 minus the sum of the connector width W2 and the transverse extension of one of the barbs 228 from the connector portion 224. The transverse extension of one of the barbs 228 from the connector portion 224 can be expressed as:

$$(X-W2)/2.$$

Thus, the maximum width W1 of each flange 268 can be expressed as:

$$W1 > Y - (W2 + (X-W2)/2).$$

FIG. 13 illustrates another construction of a tether 320, which is identical to the above described tether 220, except that the barbs 328 define an alternate shape and are proportionally larger compared to the connector portion 324. Common elements have reference numbers incremented from the 200's to the 300's. For the sake of brevity, a description of the construction of the tether 320 is not repeated, and the above description of the tether 220 is understood to apply.

As shown in FIG. 13, each of the barbs 328 defines an alternate shape such that less travel is required to install the tether 320 into the opening (not shown). Each of the barbs 328 has a bent shape defining a first (distal) portion 386 that is non-parallel with a second (proximal) portion 390. In the naturally biased rest position, the distal portion 386 defines a direction of extension that is at a larger angle with respect to the axis 26 as compared to the proximal portion 390. For example, FIG. 13 illustrates the distal portion 386 at an angle of about 90 degrees with respect to the axis 26 while the proximal portion 390 is at an acute angle α between about 60 degrees and about 80 degrees.

The invention claimed is:

1. A closure assembly for closing an opening in a container, the closure assembly comprising:
a closure member including an engagement structure configured to engage the opening;
a tether having a connector portion with a first end coupled to the closure member, and a second end opposite the first end;
a plurality of barbs positioned at the second end of the connector portion, each of the plurality of barbs having a rigid construction, wherein the plurality of barbs define a maximum splayed dimension to retain the closure member with respect to the opening; and
a movable joint coupling each of the plurality of barbs to the second end, wherein each of the plurality of barbs is foldable about the respective movable joint so that the plurality of barbs define a dimension substantially smaller than the maximum splayed dimension to allow insertion through the opening, wherein the movable joint is integrally-formed as a single piece with the second end of the connector portion and the plurality of barbs,
wherein a limiting structure provided on each of the plurality of barbs is configured to selectively contact a corresponding limiting surface provided on the second end of the connector portion to prevent folding of the plurality of barbs beyond the maximum splayed dimension, and wherein the limiting structure and the corresponding limiting surface have complementary shapes, including a projection and a recess.

2. A tether for retaining a closure member with respect to an opening, the tether comprising:

a connector portion having a first end and a second end, and an axis defined therebetween, the first end including a coupling structure configured to secure the closure member;

a plurality of barbs positioned at the second end of the connector portion, each of the plurality of barbs having a rigid construction, wherein the plurality of barbs define a maximum splayed dimension to retain the closure member with respect to the opening; and a hinge portion coupling each of the plurality of barbs to the second end, wherein each of the plurality of barbs is foldable about the respective hinge portion so that the plurality of barbs define a dimension substantially smaller than the maximum splayed dimension to allow insertion through the opening, wherein each of the hinge portions is integrally-formed as a single molded piece with the second end of the connector portion and the plurality of barbs, and wherein a limiting structure provided on each of the plurality of barbs is configured to selectively contact a corresponding limiting surface provided on the second end of the connector portion to prevent folding of the plurality of barbs beyond the maximum splayed dimension, wherein the limiting structure and the corresponding limiting surface have complementary shapes, including a projection and a recess.

3. The closure assembly of claim 1, wherein the connector portion is shape-stable.

4. The closure assembly of claim 1, wherein an aperture is defined in the first end for coupling the first end to the closure member with a fastener.

5. The closure assembly of claim 1, wherein the movable joint is a flexible strip having a substantially smaller cross-sectional thickness than each of the plurality of barbs.

6. The closure assembly of claim 5, wherein each of the plurality of barbs defines a first surface that faces the first end of the connector portion and forms an angle α between the axis and the first surface.

7. The closure assembly of claim 6, wherein the angle α is substantially 90 degrees when the barbs are in a fully extended position.

8. The closure assembly of claim 7, wherein the limiting structure is configured to limit the flexure of the angle α to 90 degrees.

9. The closure assembly of claim 1, wherein the plurality of barbs includes at least two barbs diametrically opposed from each other.

10. The tether of claim 2, wherein the connector portion is shape-stable.

11. The tether of claim 2, wherein the hinge portion is a flexible strip having a substantially smaller cross-sectional thickness than each of the plurality of barbs.

12. The tether of claim 2, wherein each of the plurality of barbs defines a first surface that faces the first end of the connector portion and forms an angle α between the axis and the first surface.

13. The tether of claim 12, wherein the angle α is substantially 90 degrees when the barbs are in a fully extended position.

14. The tether of claim 13, wherein the limiting structure is configured to limit the flexure of the angle α to 90 degrees.

15. The tether of claim 2, wherein an aperture is defined in the first end for coupling the first end to the closure member with a fastener.

16. The tether of claim 2, wherein the plurality of barbs includes at least two barbs diametrically opposed from each other.

17. The tether of claim 12, wherein the connector portion includes flanges aligned with the respective plurality of barbs and configured to limit an extent of lateral movement of the tether within the opening.

18. The tether of claim 12, wherein the angle α is between 30 degrees and 60 degrees when the barbs are in a naturally biased rest position.

19. The closure assembly of claim 6, wherein the angle α is between 30 degrees and 60 degrees when the barbs are in a naturally biased rest position.

20. The closure assembly of claim 1, wherein the limiting surface on the second end of the connector portion is positioned further from the axis than a proximal end of the movable joint.

21. The tether of claim 2, wherein the limiting surface on the second end of the connector portion is positioned further from the axis than a proximal end of the hinge portion.

22. The closure assembly of claim 1, wherein the rigid construction of the plurality of barbs and the arrangement of the corresponding movable joints results in each of the plurality of barbs having a single pivot point which is adjacent the axis at the movable joint.

23. The tether of claim 2, wherein the rigid construction of the plurality of barbs and the arrangement of the corresponding hinge portions results in each of the plurality of barbs having a single pivot point which is adjacent the axis at the hinge portion.

* * * * *